United States Patent
Palmert

(10) Patent No.: US 10,880,255 B2
(45) Date of Patent: Dec. 29, 2020

(54) SYSTEM AND METHOD IN A SOCIAL NETWORKING SYSTEM FOR FILTERING UPDATES IN AN INFORMATION FEED

(71) Applicant: salesforce.com, inc., San Francisco, CA (US)

(72) Inventor: Joel Ragnar Palmert, Stockholm (SE)

(73) Assignee: salesforce.com, inc., San Francisco, CA (US)

( * ) Notice: Subject to any disclaimer, the term of this patent is extended or adjusted under 35 U.S.C. 154(b) by 458 days.

(21) Appl. No.: 15/442,854

(22) Filed: Feb. 27, 2017

(65) Prior Publication Data

US 2018/0246970 A1  Aug. 30, 2018

(51) Int. Cl.
  *G06F 16/20* (2019.01)
  *H04L 12/58* (2006.01)
  *G06Q 10/10* (2012.01)
  *G06Q 50/00* (2012.01)

(52) U.S. Cl.
  CPC ............ *H04L 51/32* (2013.01); *G06Q 10/10* (2013.01); *G06Q 50/01* (2013.01); *H04L 51/12* (2013.01)

(58) Field of Classification Search
  None
  See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |

(Continued)

*Primary Examiner* — Kristopher Andersen
(74) *Attorney, Agent, or Firm* — LKGlobal | Lorenz & Kopf, LLP

(57) ABSTRACT

A method implemented in a database system for providing an information feed from a social networking system is provided. The method comprises receiving a request from a requesting user for an information feed of the social networking system according to configuration information customized by the requesting user. The configuration information identifies a plurality of information sources and has a set of rules for identifying which updates from the identified information sources to include in the information feed. Each information source has one or more associated updates. The method further comprising selecting a first set of updates from a plurality of updates wherein each selected update complies with the set of rules identified in the configuration information, excluding a second set of updates from the plurality of updates wherein each excluded update does not comply with the set of rules identified in the configuration information, and generating the information feed.

19 Claims, 10 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0147699 A1* | 6/2008 | Kruger .................. G06F 16/215 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0179020 A1* | 7/2011 | Ozzie .................... G06F 16/958 |
| | | 707/723 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0207801 A1* | 7/2014 | Palmert ............ G06F 16/24578 |
| | | 707/749 |

* cited by examiner

US 10,880,255 B2

SYSTEM AND METHOD IN A SOCIAL NETWORKING SYSTEM FOR FILTERING UPDATES IN AN INFORMATION FEED

TECHNICAL FIELD

Embodiments of the subject matter described herein relate generally to computer systems and social networking systems, and more particularly to techniques for customizing information feeds from social networking systems.

BACKGROUND

Enterprise social networking systems provide users with an information feed of feed items such as posts for tracked objects. Social networking system users can track project and sales opportunities, solicit input from knowledgeable colleagues, and otherwise enrich the social networking experience through updates about coworkers, customers, topics of interest, and business objects, sometimes referred to as "feed tracked changes." Users can also form groups and post messages on each other's profiles to facilitate collaboration and seek help from the community.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
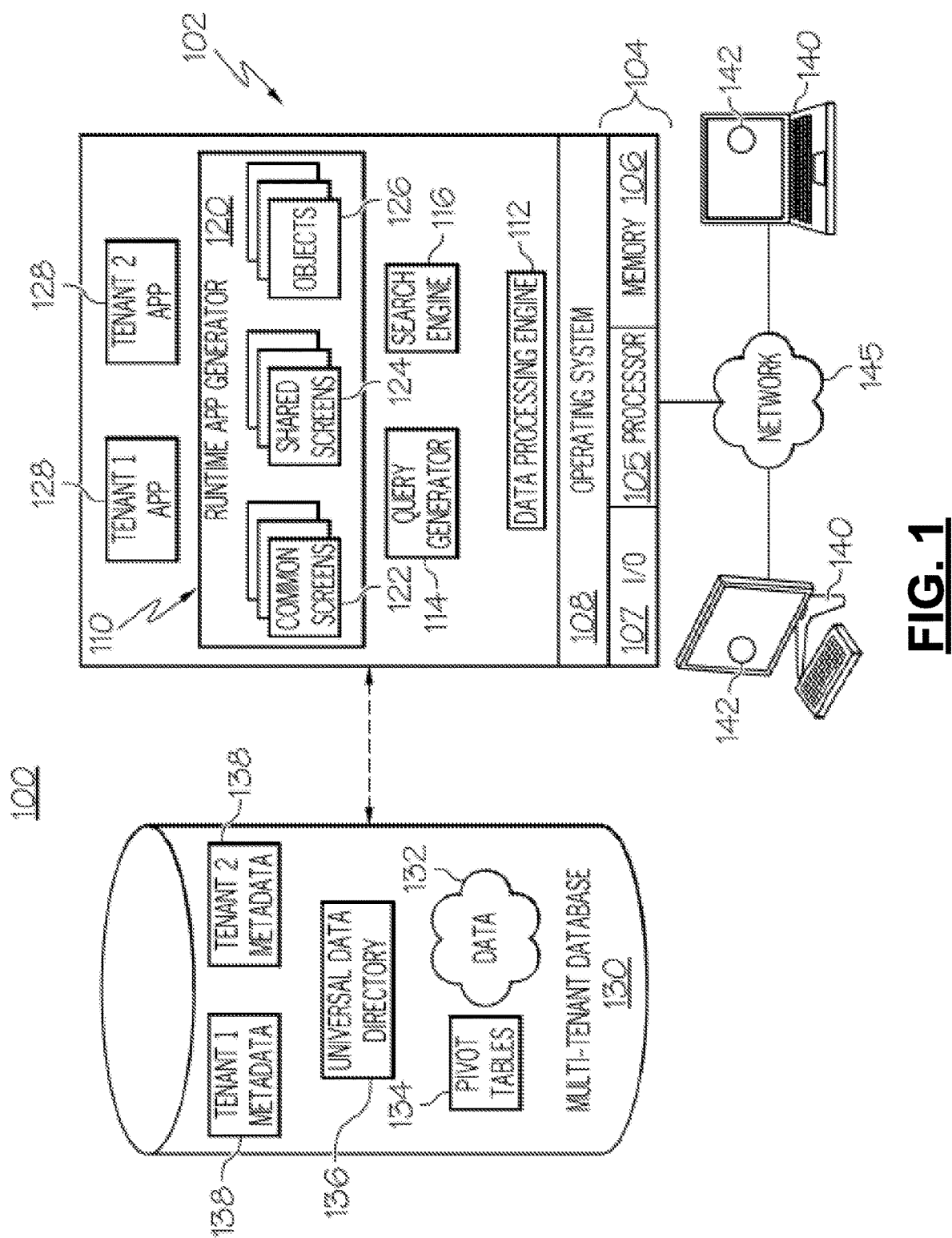
FIG. 1 is a block diagram of an example computing environment.

Social networking systems can be used to facilitate communication among social networking system users who may be individual people and/or groups of people. Social network systems may be implemented for various organizations such as business entities, business partnerships, academic institutions, groups or departments within an organization, and others. Social networking systems can provide users with access to one or more information feeds that include information updates presented as feed items or entries in the feed. A feed item may include a single information update or a collection of individual information updates. A feed item can include various types of data including character-based data, audio data, image data and/or video data. An information feed can be displayed in a graphical user interface (GUI) on a display device such as the display of a computing device. The information updates can include various social network data from various sources and can be stored in an on-demand database service environment. Feed items can be stored and maintained in one or more database tables, e.g., as rows in the table(s), that can be accessed to retrieve relevant information to be presented as part of a displayed information feed. A social networking system may be implemented in a multi-tenant database environment, although such an environment is not required in all embodiments.

A social networking system may allow a user to follow data objects in the form of records such as cases, accounts, or opportunities, in addition to following individual users and groups of users. The "following" of a record stored in a database allows a user to track the progress of that record. Updates to the record, also referred to herein as changes to the record, are one type of information update that can occur and be noted on an information feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and hyperlinks to social network data or other network data such as various documents and/or web pages on the Internet. Posts can include alphanumeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's information feed. Any number of users can follow a particular entity and thus view information updates pertaining to that entity on the users' respective information feeds. In some social networking systems, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's information feed can receive a post from the second user submitted to the second user's profile feed, also referred to herein as the user's "wall," which is one example of an information feed displayed on the user's profile page.

An information feed may be specific to a group of users of an online social network. For instance, a group of users may publish an information feed. Members of the group may view and post to the group feed in accordance with a permissions configuration for the information feed and the group. Information updates in a group context can also include changes to group status information.

With the increased use of online social networking systems, a user's information feed may include a large number of feed items, such as posts, comments, likes and dislikes, etc., potentially making it time consuming for a user to keep up with all feed items. Many of the feed items may be relevant to the user but many of the feed items may not be relevant. As a result, a user accessing the information feed may have to spend a great deal of time, energy, and effort to read through numerous feed items, identify feed items of interest, consume the content of selected information in the feed, and synthesize the information to mentally piece together a larger conversation defined by the relevant posts, comments, likes/dislikes, etc. Disclosed herein are systems and methods for customizing the information feed to focus the information feed to feed items that may be more relevant to the user.

The subject matter described herein discloses apparatus, systems, techniques and articles for customizing an information feed from a social networking system and generating an information feed based on feed updates from a user-selected tuple of information sources. In some examples, an information feed is provided that only includes feed items that are each associated with all of the information sources in a user-selected tuple of information sources. In some examples, feed items are limited to feed items that are associated with a first information source in a user-selected tuple of information sources but not associated with the other information sources in the user-selected tuple of information sources. In some examples, feed items are provided in an information feed if the feed items follow a rule provided by a user's configuration information in a configuration file. In some examples, a database server can suggest specific combinations of information sources to include in information feeds. As used herein a tuple refers to a finite ordered list of elements.

Turning now to FIG. 1, an exemplary social networking system may be implemented in the context of an example multi-tenant system 100. The example multi-tenant system 100 of FIG. 1 includes a server 102 that dynamically creates and supports virtual applications 128 based upon data 132 from a common database 130 that is shared between multiple tenants, alternatively referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100.

As used herein, a "tenant" or an "organization" should be understood as referring to a group of one or more users or entities that shares access to common subset of the data within the multi-tenant database 130. In this regard, each tenant includes one or more users associated with, assigned to, or otherwise belonging to that respective tenant. To put it another way, each respective user within the multi-tenant system 100 is associated with, assigned to, or otherwise belongs to a particular tenant of the plurality of tenants supported by the multi-tenant system 100. Tenants may represent customers, customer departments, business or legal organizations, and/or any other entities that maintain data for particular sets of users within the multi-tenant system 100 (i.e., in the multi-tenant database 130). For example, the application server 102 may be associated with one or more tenants supported by the multi-tenant system 100. Although multiple tenants may share access to the server 102 and the database 130, the particular data and services provided from the server 102 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 132 belonging to or otherwise associated with other tenants.

The multi-tenant database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128. The multi-tenant database 130 may alternatively be referred to herein as an on-demand database, in that the multi-tenant database 130 provides (or is available to provide) data at run-time to on-demand virtual applications 128 generated by the application platform 110.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or application platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request. In this manner, the query generator 114 suitably obtains requested subsets of data 132 accessible to a user and/or tenant from the database 130 as needed to populate the tables, reports or other features of the particular virtual application 128 for that user and/or tenant.

Still referring to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 126 such as "account" objects, "opportunity" objects, "contact" objects, or the like. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130. Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain Java, ActiveX, or other content that can be presented using conventional client software running on the client device 140; other embodiments may simply provide dynamic web or other content that can be presented and viewed by the user, as desired. In various embodiments, application 128 embodies the functionality of a collaboration solution such as a social networking system.

Figure 2:
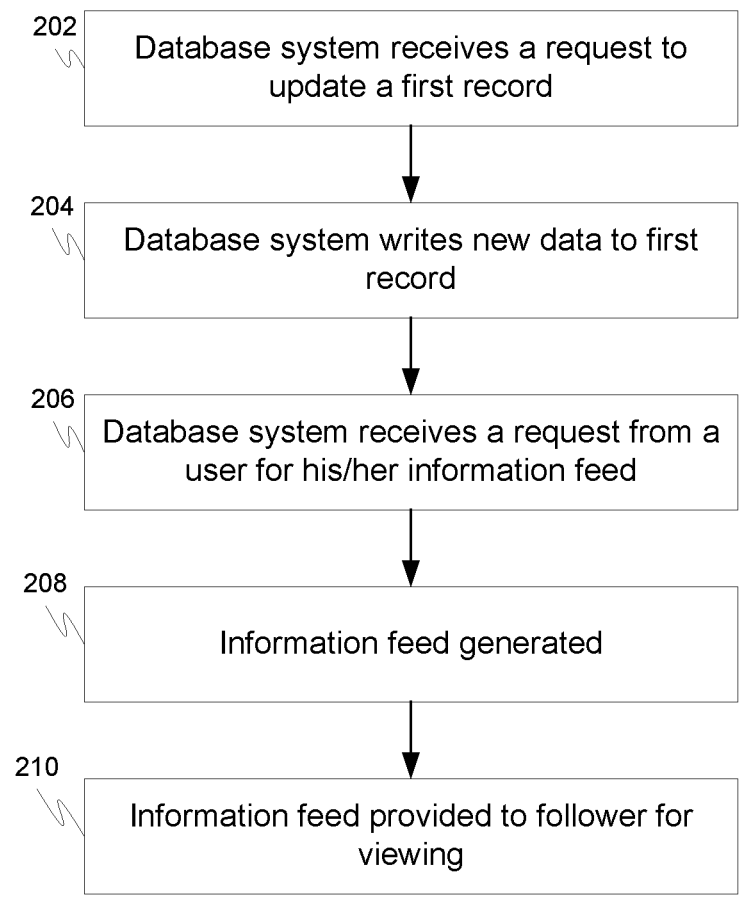
FIG. 2 is a process flow chart depicting an example process for tracking updates to a data object stored in a social networking system.

FIG. 2 is a process flow chart depicting an example process for tracking updates to a record stored in a social networking system. This example process (and other processes described herein) may be implemented at least partially with a multi-tenant database system, e.g., by one or more processors configured to receive or retrieve information, process the information, store results, and transmit the results. This example process may also be implemented at least partially with a single tenant database system.

At operation 202, the database system receives a request to update a first record. The request may be received from a user. For example, a user may access, change and save a page associated with the first record. The database system may also automatically create the request to update the first record. For instance, the database system can create the request in response to another event, e.g., a request to change a field could be sent periodically at a particular date and/or time of day, or a change to another field or object. The database system can obtain a new value based on other fields of a record and/or based on parameters in the system.

The request for the update of a field of a record is an example of an event associated with the first record for which a feed tracked update may be created. The database system can also identify other events besides updates to fields of a record for which a feed tracked update may be created. For example, an event can be a submission of approval to change a field. Such an event can also have an associated field (e.g., a field showing a status of whether a change has been submitted). Other examples of events can include creation of a record, deletion of a record, converting a record from one type to another (e.g., converting a lead to an opportunity), closing a record (e.g., a case type record), and potentially any other state change of a record—any of which could include a field change associated with the state change. Any of these events update the record whether by changing a field of the record, a state of the record, or some other characteristic or property of the record. In one implementation, a list of supported events for creating a feed tracked update can be maintained within the database system, e.g., at a server or in a database.

In response to the request to update a first record, the database system writes new data to the first record (operation 204). The new data may include a new value that replaces old data. For example, a field may be updated with a new value. The new data may also be a value for a field that did not contain data before. Also, the new data could be a flag, e.g., for a status of the record, which can be stored as a field of the record.

A user of the social networking system may be a follower a number of records including the first record. The user may access the social networking system and request access to his/her information feed (operation 206). The social networking system generates an information feed for the user based on updates to the records the user is following (operation 208). Although the example process shows the information feed being generated after the user requests access to the information feed, in other examples, the information feed may be generated, updated and stored contemporaneously with feed items becoming available for the information feed. In these examples, instead of generating an information feed in response to a user's request for the information, i.e., generating an information feed on the fly, the previously generated and stored information feed is retrieved. Finally, the information feed is provided to the user for viewing (operation 210) in a user interface such as a graphical user interface provided by browser displaying a web page.

Figure 3:
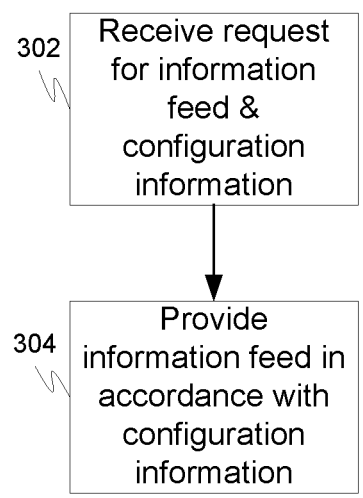
FIG. 3 is a process flow chart depicting an example process for providing an information feed in which the feed items are selected from multiple information sources according to a rule specified in a user's configuration file.

FIG. 3 is a process flow chart depicting an example process for providing an information feed in which the feed items are selected from multiple information sources according to a rule specified in a user's configuration file. In this example process, a request for an information feed from a user and a user's configuration information is received by the social network. The configuration information is customized by the requesting user (i.e., user selected) and identifies a plurality of information sources selected by the user from which to generate the user's information feed. The user-selected information sources may also be suggested by the social networking system (e.g., a database server) and subsequently selected by the user.

The configuration information also includes a set of rules for identifying which updates from the identified information sources to include in the information feed. As an example, a rule may require that included feed items must be associated with each information source. As another example, the rule may require that an update must be associated with a first information source identified by the configuration information but not associated with any other information source identified by the configuration information. Other rules may exist.

The order in which the request for the information feed and the user's configuration information are received is not specified in this example. The request for the information feed may be received first and the user's configuration information received shortly thereafter, or vice versa, or both received simultaneously. After both the request for the information feed and the user's configuration information are received, the social networking system provides the information feed in accordance with the rule specified in the configuration information (operation 304).

An update may be associated with multiple information sources. As an example, a user may be part of a group of users and comments on a topic that is associated with a data object. The user's comment may create an update to an object associated with the user, an update to the object associated with the group to which the user belongs, and an update to the object that is associated with the topic. Some mechanism such as a key may be used to identify that each of these updates are related.

Figure 4:
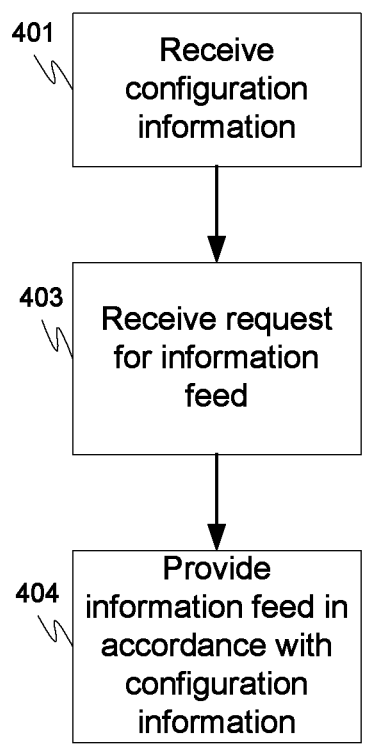
FIG. 4 is a process flow chart depicting another example process for providing an information feed in which the feed items are selected from multiple information sources according to a rule specified in a user's configuration file.

FIG. 4 is a process flow chart depicting another example process for providing an information feed in which the feed items are selected from multiple information sources according to a rule specified in a user's configuration file. In this example process, configuration information is received (operation 401) before a request for an information feed is received (operation 403). After both the request for the information feed and the user's configuration information are received, the social networking system provides the information feed in accordance with the rule(s) specified in the configuration information (operation 404). The operation 404 is similar to the operation 304 described previously with reference to FIG. 3.

The configuration information is customized by the requesting user (i.e., user selected) and identifies a plurality of information sources selected by the user from which to generate the user's information feed. The user-selected information sources may also be suggested by the social networking system (e.g., a database server) and subsequently selected by the user.

The configuration information also includes a set of rules for identifying which updates from the identified information sources to include in the information feed. As an example, a rule may require that included feed items must be associated with each information source. As another example, the rule may require that an update must be associated with a first information source identified by the configuration information but not associated with any other information source identified by the configuration information. Other rules may exist.

Figure 5:
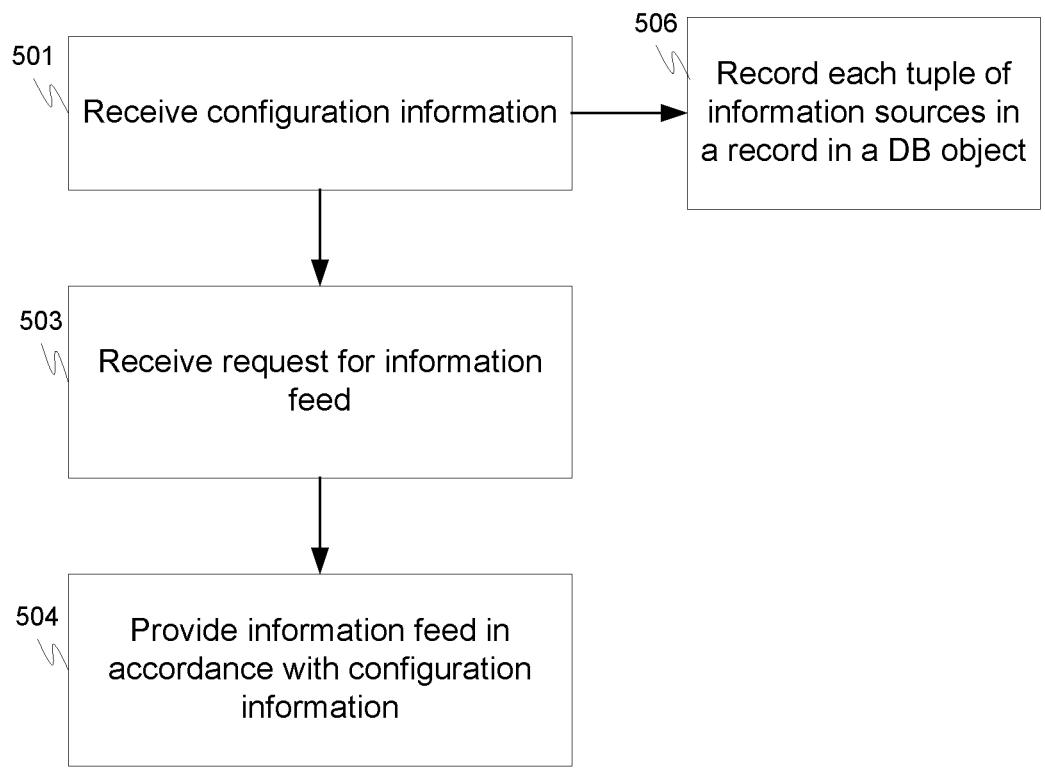
FIG. 5 is a process flow chart depicting another example process for providing an information feed.

FIG. 5 is a process flow chart depicting another example process for providing an information feed. In this example process, configuration information is first received (operation 501) and the request for the information feed is subsequently received (operation 503). After both the request for the information feed and the user's configuration are received, the social networking system provides the information feed in accordance with the rule specified in the configuration information (operation 504). This example process also illustrates that the received configuration information includes the identity of a tuple (i.e. finite ordered list of elements) of information sources that are recorded in a database object (operation 506). Thus, a user can specify before any request for an information feed, the tuple of information sources from which the feed items in the information source will be derived.

Figure 6:
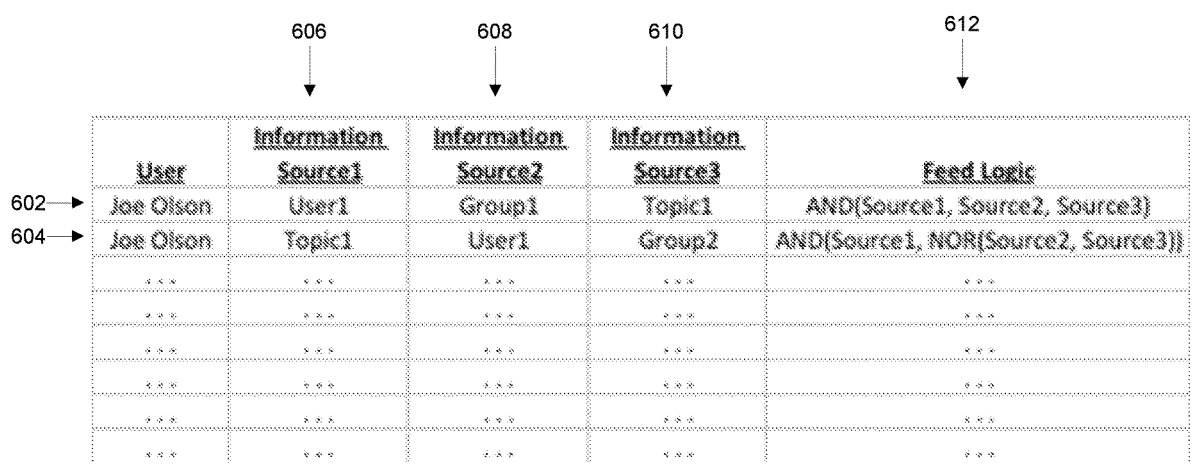
FIG. 6 is a chart depicting example configuration information that may be stored in a record.

FIG. 6 is a chart depicting example configuration information that may be stored as one or more records in a data object in a database system. In this example, a user, Joe Olson, has two records 602, 604 that each identify a tuple of information sources 606, 608, 610 from which feed updates will be derived and a rule 612 for the record. Three information sources are included in each of the first record 602 and the second record 604 in this example. Although three information sources are shown, the number of sources in a record may be a different number as long as the tuple includes two or more information sources. The first record 602 also illustrates that there may be different types of information sources in a tuple such as a user (e.g., User1), a group (e.g., Group1), or a topic (e.g., Topic1).

Each record also provides a rule 612 (e.g., Feed Logic) to be followed with regard to the tuple of information sources 606, 608, 610. In the first record 602, the rule (i.e., AND (Source1, Source2, Source3)) specifies that a feed item may only be included in the information feed if the feed item is associated with each of the information sources in the tuple. The second record provides a different rule. In the second record, the rule (i.e., AND(Source1, NOR(Source2, Source3))) specifies that a feed item may only be included in the information feed if the feed item is related to the first information source (Source1) and not related to either the second information source (Source2) or the third information source (Source3). When the user requests an information feed, a feed will be generated comprising feed items from the information sources specified and following the rule provided. In other examples, other rules may be specified for a record.

Figure 7:
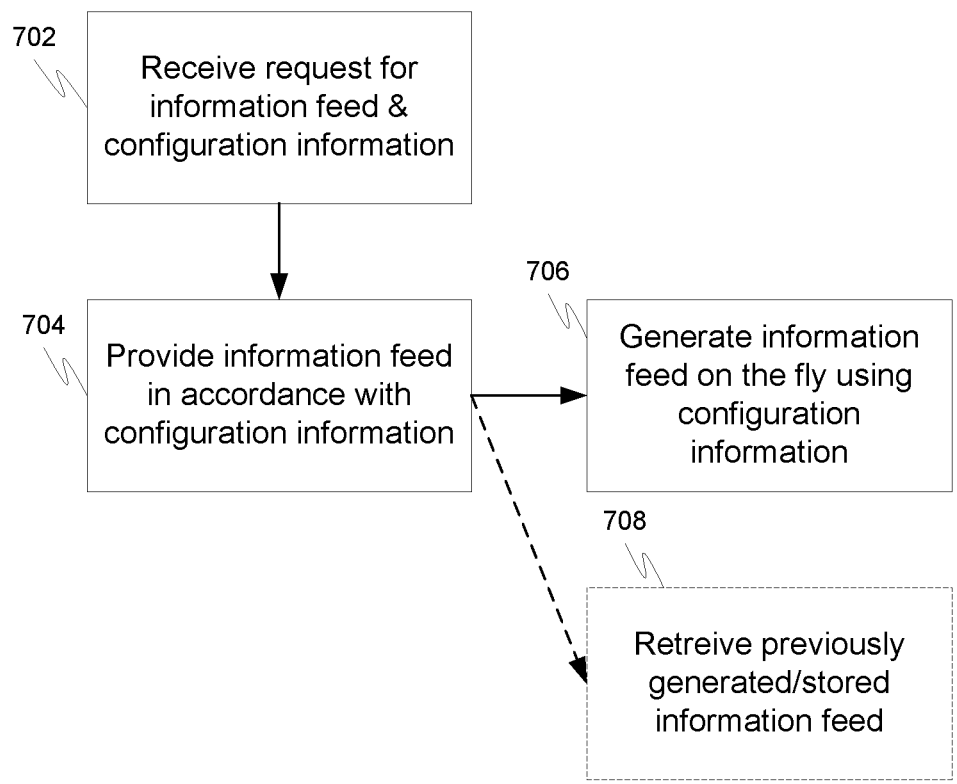
FIG. 7 is a process flow chart depicting another example process for providing an information feed.

FIG. 7 is a process flow chart depicting another example process for providing an information feed. In this example process, a request for an information feed from a user and a user's configuration information are received by the social networking system (operation 702). The order in which the request for the information feed and the user's configuration are received is not specified. The request for the information feed may be received first and the user's configuration shortly thereafter, or vice versa, or both received simultaneously. After both the request for the information feed and the user's configuration are received, the social networking system provides the information feed in accordance with the rule specified in the configuration information (operation 704). This example illustrates that the information feed may be generated on the fly using the configuration information (operation 706) after a request for the information has been received by the social network. Alternatively, this example also illustrates that the information feed may have been previously generated and stored, and the previously generated/stored information feed can be retrieved and provided (operation 708) after a request for the information has been received by the social network.

Figure 8:
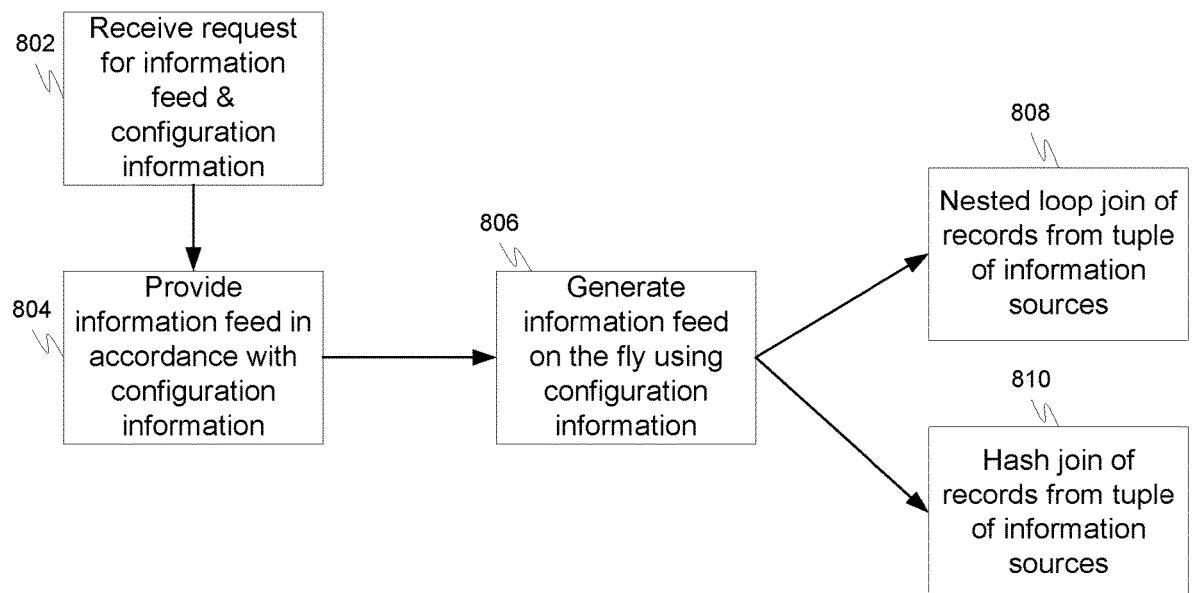
FIG. 8 is a process flow chart depicting another example process for providing an information feed.

FIG. 8 is a process flow chart depicting another example process for providing an information feed. In this example process, a request for an information feed from a user and a user's configuration information are received by the social networking system (operation 802). The order in which the request for the information feed and the user's configuration are received is not specified. The request for the information feed may be received first and the user's configuration shortly thereafter, or vice versa, or both received simultaneously. After both the request for the information feed and the user's configuration are received, the social networking system provides the information feed in accordance with the rule specified in the configuration information (operation 804). In this example, the information feed is generated on the fly using the configuration information (operation 806) after a request for the information has been received by the social network. This example also illustrates two different algorithmic techniques that may be used to generate the information feed. The example method may employ a nested loop join algorithm to join records from the tuple of information sources to generate the information feed (operation 808). Alternatively, the example method may employ a hash join algorithm to join records from the tuple of information sources to generate the information feed (operation 810). Either of these algorithmic methods allow the social networking system to select a first set of updates from a plurality of updates, each selected update complying with the set of rules identified in the configuration information and exclude, a second set of updates from the plurality of updates, each excluded update not complying with the set of rules identified in the configuration information.

The nested loop join algorithm may be more appropriate when a small amount of data needs to be returned. Also, the nested loop algorithm may be more appropriate when a first information source has a small amount of data and a second information source has a lot of data and/or when very little of the data in the first information source is also in the second information source.

Figure 9:
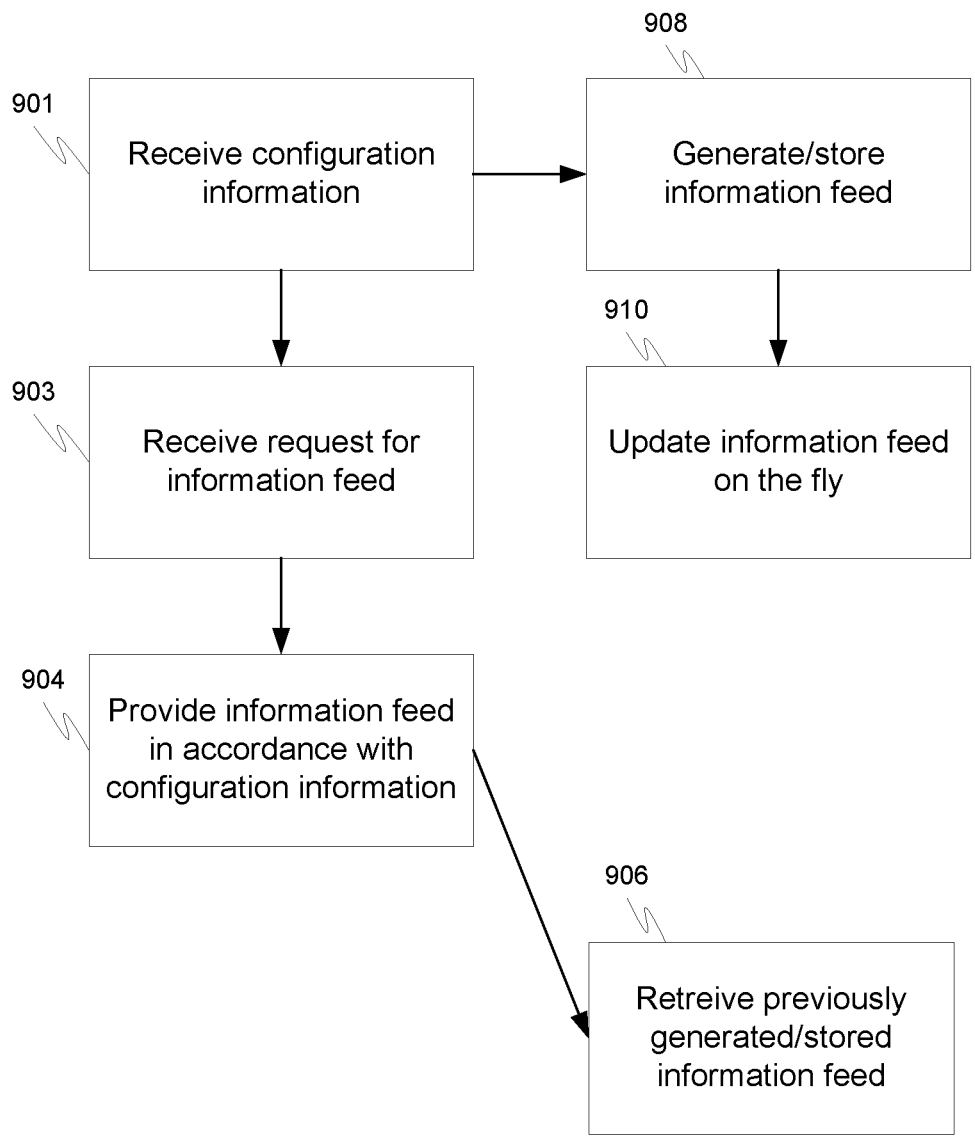
FIG. 9 is a process flow chart depicting another example process for providing an information feed.

FIG. 9 is a process flow chart depicting another example process for providing an information feed. In the example process, configuration information is first received (operation 901) and the request for the information feed is subsequently received (operation 903). After both the request for the information feed and the user's configuration are received, the social networking system provides the information feed in accordance with the rule specified in the configuration information (operation 904). this example also illustrates that the information feed may have been previously generated and stored, and the previously generated/stored information feed can be retrieved and provided (operation 906) after a request for the information has been received by the social network. This example illustrates that the generated/stored information feed may be generated at the time the configuration information is received (or shortly thereafter) (operation 908). The example also illustrates that the information feed may be updated at different times prior to the request by the user for the information feed (operation 910). As an example, the information feed may be scheduled to be updated periodically or at some set times. Also, the information feed may be checked for updates whenever a feed item is generated for one on of the sources in the tuple of sources.

Figure 10:
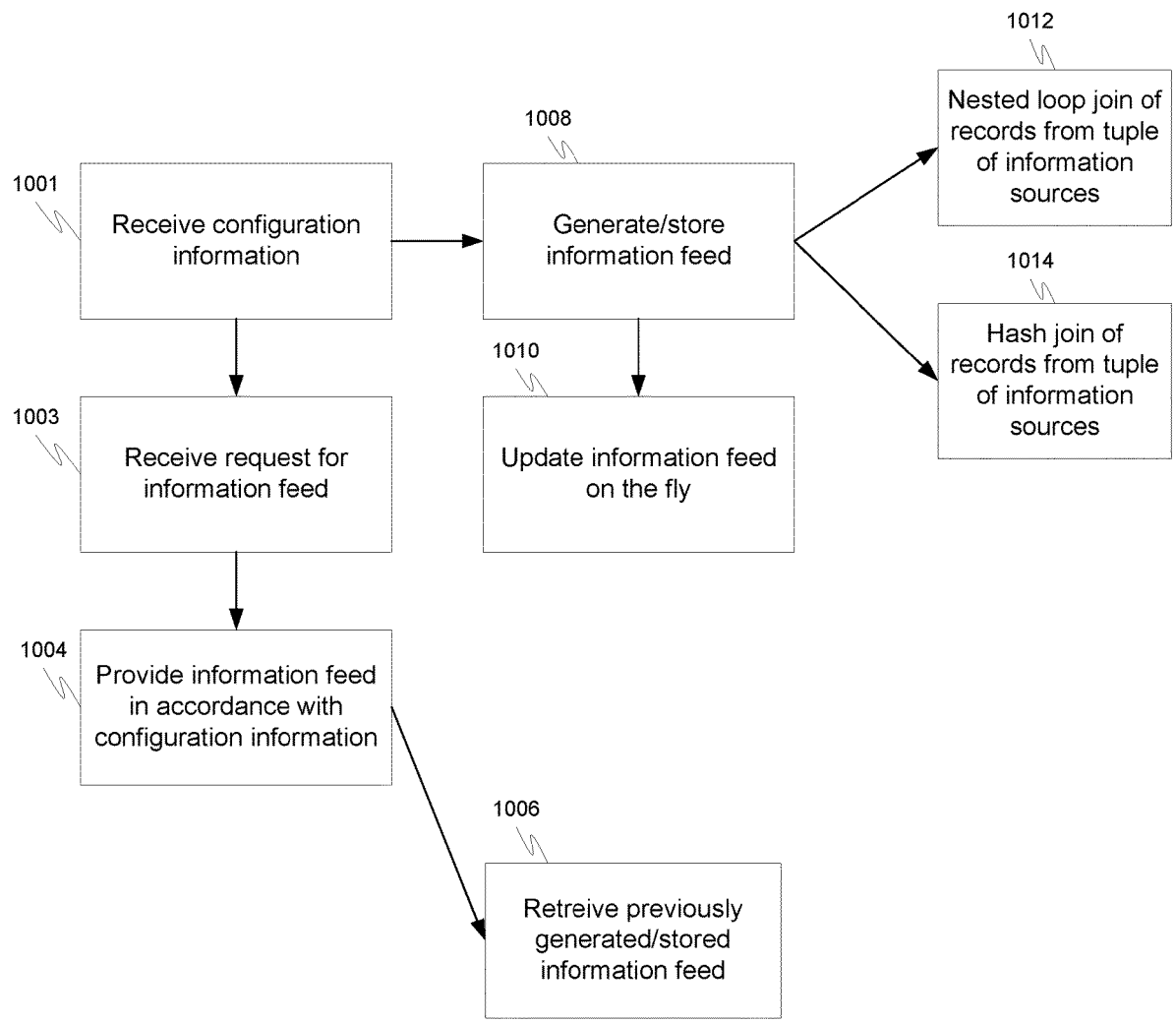
FIG. 10 is a process flow chart depicting another example process for providing an information feed.

FIG. 10 is a process flow chart depicting another example process for providing an information feed. In the example process, configuration information is first received (operation 1001) and the request for the information feed is subsequently received (operation 1003). After both the request for the information feed and the user's configuration are received, the social networking system provides the information feed in accordance with the rule specified in the configuration information (operation 1004). In this example, the information feed was generated and stored prior to receipt of the request for the information feed. This previously generated/stored information feed is retrieved and provided (operation 1006) after a request for the information has been received by the social network. In this example, the generated/stored information feed was generated at or around the time the configuration information is received (operation 1008). In this example, the information feed may be updated at different times prior to the request by the user for the information feed (operation 1010). As an example, the information feed may be scheduled to be updated periodically or at some set times. Also, the information feed may be checked for updates whenever a feed item is generated for one on of the sources in the tuple of sources.

This example also illustrates two different algorithmic techniques that may be used to generate the information feed. The example method may employ a nested loop join algorithm to join the records from the tuple of information sources to generate the information feed (operation 1012). Alternatively, the example method may employ a hash join algorithm to join the records from the tuple of information sources to generate the information feed (operation 1014). Either of these algorithmic methods allow the social networking system to select a first set of updates from a plurality of updates, each selected update complying with the set of rules identified in the configuration information and exclude, a second set of updates from the plurality of updates, each excluded update not complying with the set of rules identified in the configuration information.

The apparatus, systems, techniques and articles described herein allow for customizing an information feed from a social networking system and generating an information feed based on feed updates from a user-selected tuple of information sources. In some examples, an information feed is provided that only includes feed items that are each associated with all of the information sources in a user-selected tuple of information sources. In some examples, feed items are limited to feed items that are associated with a first information source in a user-selected tuple of information sources but not associated with the other information sources in the user-selected tuple of information sources. In some examples, feed items are provided in an information feed if the feed items follow a rule provided by a user's configuration information in a configuration file. In some examples, a database server can suggest specific combinations of information sources to include in information feeds.

In one embodiment, a method implemented in a database system for providing an information feed from a social networking system is provided. The method comprises receiving a request from a requesting user for an information feed of the social networking system according to configuration information customized by the requesting user. The configuration information identifies a plurality of information sources. Each information source has one or more associated updates. The configuration information has a set of rules for identifying which updates from the identified information sources to include in the information feed. The method further comprising selecting, using the database system, a first set of updates from a plurality of updates wherein each selected update complies with the set of rules identified in the configuration information. The method further comprising excluding, using the database system, a second set of updates from the plurality of updates wherein each excluded update does not comply with the set of rules identified in the configuration information. The method also comprises generating, using the database system, the information feed wherein the generated information feed includes the first set of updates as feed items and omits the second set of updates. The generated information feed is capable of being displayed on a display device.

These aspects and other embodiments may include one or more of the following features. An information source may comprise a second user, a user group, or a record. The configuration information may be stored as one or more records in a data object in the database system wherein each record identifies a tuple of information sources and a rule for the record. A record may identify a tuple of information sources and the rule for the record may require that the included feed items must be associated with each information source. A record may identify a tuple of information sources and the rule for the record may require that the included feed items must be associated with a first information source identified by the configuration information but not associated with any other information source identified by the configuration information. The information feed may be generated after receiving a request from a requesting user for an information feed of the social networking system. The information feed may be generated prior to receiving a request from a requesting user for an information feed of the social networking system. The information feed may be generated using a nested loop algorithm. The information feed may be generated using a hash join algorithm.

In another embodiment, a database system is disclosed. The database system comprises one or more processors and non-transient computer readable media encoded with programming instructions. The programming instructions when executed by the one or more processors cause the database system to receive a request from a requesting user for an information feed of a social networking system according to configuration information customized by the requesting user. The configuration information identifies a plurality of information sources. Each information source has one or more associated updates. The configuration information has a set of rules for identifying the updates from the identified information sources to include in the information feed. The programming instructions when executed by the one or more processors further cause the system to select a first set of updates from a plurality of updates. Each selected update complies with the set of rules identified in the configuration information. The programming instructions when executed by the one or more processors further cause the system to exclude a second set of updates from the plurality of updates wherein each excluded update does not comply with the set of rules identified in the configuration information and generate the information feed wherein the generated information feed includes the first set of updates as feed items and omits the second set of updates. The generated information feed is capable of being displayed on a display device.

These aspects and other embodiments may include one or more of the following features. An information source may comprise a second user, a user group, or a record. The configuration information may be stored as one or more records in a data object in the database system wherein each record identifies a tuple of information sources and a rule for the record. A record may identify a tuple of information sources and the rule for the record may require that the included feed items must be associated with each information source. A record may identify a tuple of information sources and the rule for the record may require that the included feed items must be associated with a first information source identified by the configuration information but not associated with any other information source identified by the configuration information. The programming instructions when executed by the one or more processors may cause the system to generate the information feed after receiving a request from a requesting user for an information feed of the social networking system. The programming instructions when executed by the one or more processors may cause the system to generate the information feed prior to receiving a request from a requesting user for an information feed of the social networking system. The programming instructions when executed by the one or more processors may cause the system to generate the information feed using a nested loop algorithm. The programming instructions when executed by the one or more processors may cause the system to generate the information feed using a hash join algorithm.

In another embodiment, non-transient computer readable media encoded with programming instructions for performing a method is provided. The method comprises receiving a request from a requesting user to generate an information feed from a social networking system according to configuration information customized by the requesting user wherein the configuration information identifies a plurality of information sources and wherein each information source has one or more associated updates. The configuration information has a set of rules for identifying the updates from the identified information sources to include in the information feed. The method further comprises selecting, using the database system, a first set of updates from a plurality of updates wherein each selected update complies with the set of rules identified in the configuration information, excluding, using the database system, a second set of updates from the plurality of updates wherein each excluded update does not comply with the set of rules identified in the configuration information, and generating, using the database system, the information feed wherein the generated information feed includes the first set of updates as feed items and omits the second set of updates. The generated information feed is capable of being displayed on a display device.

These aspects and other embodiments may include one or more of the following features. An information source may comprise a second user, a user group, or a record. The programming instructions may cause the configuration information to be stored as one or more records in a data object in the database system wherein each record identifies a tuple of information sources and a rule for the record. The programming instructions may cause a record to identify a tuple of information sources and the rule for the record may require that the included feed items must be associated with each information source. The programming instructions may cause a record to identify a tuple of information sources and the rule for the record may require that the included feed items must be associated with a first information source identified by the configuration information but not associated with any other information source identified by the configuration information.

In yet another embodiment, a method implemented in a database system for providing an information feed from a social networking system is provided. The method comprises receiving a request from a requesting user to generate an information feed of the social networking system according to configuration information customized by the requesting user. The configuration information is stored as a data object in the database system and identifies a plurality of information sources followed by the requesting user. Each information source has a plurality of associated updates stored in a specific information-source data object in the database system. The configuration information identifies the updates from the identified information sources to include in the information feed. The method further comprises selecting, using the database system, a first set of updates from the plurality of updates wherein each selected update is associated with each information source identified in the configuration information, excluding, using the database system, a second set of updates from the plurality of updates wherein each excluded update is not associated with each information source identified in the configuration information, and generating, using the database system, the information feed. The generated information feed includes the first set of updates as feed items and omits the second set of updates wherein the generated information feed is capable of being displayed on a display device.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method implemented in a database system for providing an information feed from a social networking system, the method comprising:

receiving a request from a requesting user for an information feed of the social networking system that complies with configuration information customized by the requesting user, the configuration information identifying a first and a second plurality of user-selected information sources and first and second user-selected feed logic, wherein each user-selected information source has one or more associated feed updates, wherein the second user-selected feed logic is different from the first user-selected feed logic, and wherein the second plurality of user-selected information sources is different from the first plurality of user-selected information sources;

receiving feed updates from the first and second plurality of user-selected information sources;

applying the first user-selected feed logic to each feed update from the first plurality of user-selected information sources to identify which of the feed updates from the first plurality of user-selected information sources to include in the information feed, wherein the identified feed items from the first plurality of user-selected information sources are the feed items that are associated with all of the information sources in the first plurality of user-selected information sources, wherein a feed item is associated with an information source when the feed item was received from the information source or is redundant to a different feed item that was received from the information source;

applying the second user-selected feed logic to each feed update from the second plurality of user-selected information sources to identify which of the feed updates from the second plurality of user-selected information sources to include in the information feed;

generating the information feed from the identified feed updates from the first plurality of user-selected information sources and the second plurality of user-selected information sources; and providing the generated information feed to the requesting user.

2. The method of claim 1 wherein the configuration information is stored as one or more records in a data object in the database system, each record identifying a tuple of information sources and a rule for the record.

3. The method of claim 1, wherein the identified feed items from the second plurality of user-selected information sources are the feed items that are associated with a first information source of the second plurality of user-selected information sources but not associated with the other information sources of the second plurality of user-selected information sources, wherein a feed item is associated with an information source when the feed item was received from the information source or is redundant to a different feed item that was received from the information source.

4. The method of claim 1 wherein the information feed is generated after receiving a request from a requesting user for an information feed of the social networking system.

5. The method of claim 1 wherein the information feed is generated prior to receiving a request from a requesting user for an information feed of the social networking system.

6. The method of claim 1, further comprising employing a nested loop algorithm to join records from the first and second plurality of user-selected information sources in accordance with the first and second user-selected feed logic to generate the information feed.

7. The method of claim 1, further comprising employing a hash join algorithm to join records from the first and second plurality of user-selected information sources in accordance with the first and second user-selected feed logic to generate the information feed.

8. A database system comprising:
one or more processors; and
non-transitory computer readable media encoded with programming instructions for configuring the one or more processors;
wherein the one or more processors are configured by the programming instructions to:
receive a request from a requesting user for an information feed of the social networking system that complies with configuration information customized by the requesting user, the configuration information identifying a first and second plurality of user-selected information sources and first and second user-selected feed logic, wherein each user-selected information source has one or more associated feed updates, wherein the second user-selected feed logic is different from the first user-selected feed logic, and wherein the second plurality of user-selected information sources is different from the first plurality of user-selected information sources;
receive feed updates from the first and second plurality of user-selected information sources;
apply the first user-selected feed logic to each feed update from the first plurality of user-selected information sources to identify which of the feed updates from the first plurality of user-selected information sources to include in the information feed, wherein the identified feed items from the first plurality of user-selected information sources are the feed items that are associated with all of the information sources in the first plurality of user-selected information sources, wherein a feed item is associated with an information source when the feed item was received from the information source or is redundant to a different feed item that was received from the information source;
apply the second user-selected feed logic to each feed update from the second plurality of user-selected information sources to identify which of the feed updates from the second plurality of user-selected information sources to include in the information feed;
generate the information feed from the identified feed updates; and
provide the generated information feed to the requesting user.

9. The database system of claim 8 wherein the configuration information is stored as one or more records in a data object in the database system, and each record identifies a tuple of information sources and a rule for the record.

10. The database system of claim 8 wherein the identified feed items from the second plurality of user-selected information sources are the feed items that are associated with a first information source of the second plurality of user-selected information sources but not associated with the other information sources of the second plurality of user-selected information sources, wherein a feed item is associated with an information source when the feed item was received from the information source or is redundant to a different feed item that was received from the information source.

11. The system of claim 8 wherein the programming instructions when executed by the one or more processors cause the system to generate the information feed after receiving a request from a requesting user for an information feed of the social networking system.

12. The system of claim 8 wherein the programming instructions when executed by the one or more processors cause the system to generate the information feed prior to receiving a request from a requesting user for an information feed of the social networking system.

13. The database system of claim 8, wherein the programming instructions when executed by the one or more processors cause the system to employ a nested loop algorithm to join records from the first and second plurality of user-selected information sources in accordance with the first and second user-selected feed logic to generate the information feed.

14. The database system of claim 8, wherein the programming instructions when executed by the one or more processors cause the system to employ a hash join algorithm to join records from the first and second plurality of user-selected information sources in accordance with the first and second user-selected feed logic to generate the information feed.

15. Non-transitory computer readable media encoded with programming instructions for performing a method, the method comprising:
receiving a request from a requesting user to generate an information feed from a social networking system that complies with configuration information customized by the requesting user, the configuration information identifying a first and a second plurality of user-selected information sources and first and second user-selected feed logic, wherein each user-selected information source has one or more associated feed updates, wherein the second user-selected feed logic is different from the first user-selected feed logic, and wherein the second plurality of user-selected information sources is different from the first plurality of user-selected information sources;
receiving feed updates from the first and second plurality of user-selected information sources;
applying the first user-selected feed logic to each feed update from the first plurality of user-selected information sources to identify which of the feed updates from the first plurality of user-selected information sources to include in the information feed, wherein the identified feed items from the first plurality of user-selected information sources are the feed items that are associated with all of the information sources in the first plurality of user-selected information sources, wherein a feed item is associated with an information source when the feed item was received from the information source or is redundant to a different feed item that was received from the information source;

applying the second user-selected feed logic to each feed update from the second plurality of user-selected information sources to identify which of the feed updates from the second plurality of user-selected information sources to include in the information feed;

generating the information feed from the identified feed updates from the first plurality of user-selected information sources and the second plurality of user-selected information sources; and providing the generated information feed to the requesting user.

16. The non-transitory computer readable media of claim 15 wherein the programming instructions cause the configuration information to be stored as one or more records in a data object in the database system, each record identifying a tuple of information sources and a rule for the record.

17. The non-transitory computer readable media of claim 15 wherein the identified feed items from the second plurality of user-selected information sources are the feed items that are associated with a first information source of the second plurality of user-selected information sources but not associated with the other information sources of the second plurality of user-selected information sources, wherein a feed item is associated with an information source when the feed item was received from the information source or is redundant to a different feed item that was received from the information source.

18. The non-transitory computer readable media of claim 15, wherein the method further comprises employing a nested loop algorithm to join records from the first and second plurality of user-selected information sources in accordance with the first and second user-selected feed logic to generate the information feed.

19. The non-transitory computer readable media of claim 15, wherein the method further comprises employing a hash join algorithm to join records from the first and second plurality of user-selected information sources in accordance with the first and second user-selected feed logic to generate the information feed.

* * * * *